(12) United States Patent
Hayakawa et al.

(10) Patent No.: US 7,365,949 B2
(45) Date of Patent: Apr. 29, 2008

(54) CPP GIANT MAGNETORESISTIVE HEAD INCLUDING PINNED MAGNETIC LAYER THAT EXTENDS IN THE HEIGHT DIRECTION

(75) Inventors: Yasuo Hayakawa, Tokyo (JP); Yoshihiro Nishiyama, Tokyo (JP); Digo Aoki, Tokyo (JP); Masamichi Saito, Tokyo (JP); Naohiro Ishibashi, Tokyo (JP); Kenji Honda, Tokyo (JP)

(73) Assignee: TDK Corporation, Tokyo (JP)

( * ) Notice: Subject to any disclaimer, the term of this patent is extended or adjusted under 35 U.S.C. 154(b) by 403 days.

(21) Appl. No.: 11/141,543

(22) Filed: May 31, 2005

(65) Prior Publication Data
US 2005/0270703 A1 Dec. 8, 2005

(30) Foreign Application Priority Data
Jun. 4, 2004 (JP) ............................... 2004-167391

(51) Int. Cl.
*G11B 5/33* (2006.01)
*G11B 5/127* (2006.01)

(52) U.S. Cl. .................................................. 360/324.1

(58) Field of Classification Search ................ 360/324, 360/324.1, 324.11; 324/207.21, 252; 338/32 R
See application file for complete search history.

(56) References Cited

U.S. PATENT DOCUMENTS

| | | | |
|---|---|---|---|
| 5,739,987 A | | 4/1998 | Yuan et al. |
| 6,104,189 A | * | 8/2000 | Allenspach et al. ........ 324/252 |
| 6,381,107 B1 | * | 4/2002 | Redon et al. ............ 360/324.2 |
| 6,636,395 B1 | * | 10/2003 | Terunuma .............. 360/324.11 |
| 6,757,142 B1 | * | 6/2004 | Terunuma ................ 360/324.1 |
| 7,190,559 B2 | * | 3/2007 | Kagami et al. ......... 360/324.11 |
| 2004/0061986 A1 | * | 4/2004 | Kagami et al. ......... 360/324.11 |
| 2004/0252417 A1 | * | 12/2004 | Hasegawa et al. ...... 360/324.11 |
| 2006/0103988 A1 | * | 5/2006 | Lin et al. ................. 360/324.1 |

FOREIGN PATENT DOCUMENTS

| | | |
|---|---|---|
| JP | 11-121832 | 5/1999 |
| JP | 2001-266313 | 9/2001 |
| JP | 2001-307307 | 11/2001 |
| JP | 2002-289945 | 10/2002 |
| JP | 2002-305338 | 10/2002 |
| JP | 2003-017785 | 1/2003 |
| JP | 2003-31871 | 1/2003 |
| JP | 2004-118978 | 4/2004 |

* cited by examiner

*Primary Examiner*—Brian E. Miller
(74) *Attorney, Agent, or Firm*—Brinks Hofer Gilson & Lione

(57) ABSTRACT

A CPP giant magnetoresistive head includes a lower shield layer; an upper shield layer; and a giant magnetoresistive element (GMR) between the lower shield layer and the upper shield layer. The GMR includes a nonmagnetic material layer; a pinned magnetic layer; and a free magnetic layer. The pinned layer and the free layer are laminated with the nonmagnetic layer provided therebetween. A current flows perpendicularly to a film plane of the GMR, the pinned magnetic layer extends in the height direction longer than in a track-width direction and includes a first portion in the GMR. The first portion is disposed above or below the nonmagnetic layer and the free layer. A second portion is behind the nonmagnetic layer and the free layer in the height direction. The first and second portions are in the same plane. The width of the pinned layer in the track-width direction in the first portion is greater than that in the second portion.

6 Claims, 6 Drawing Sheets

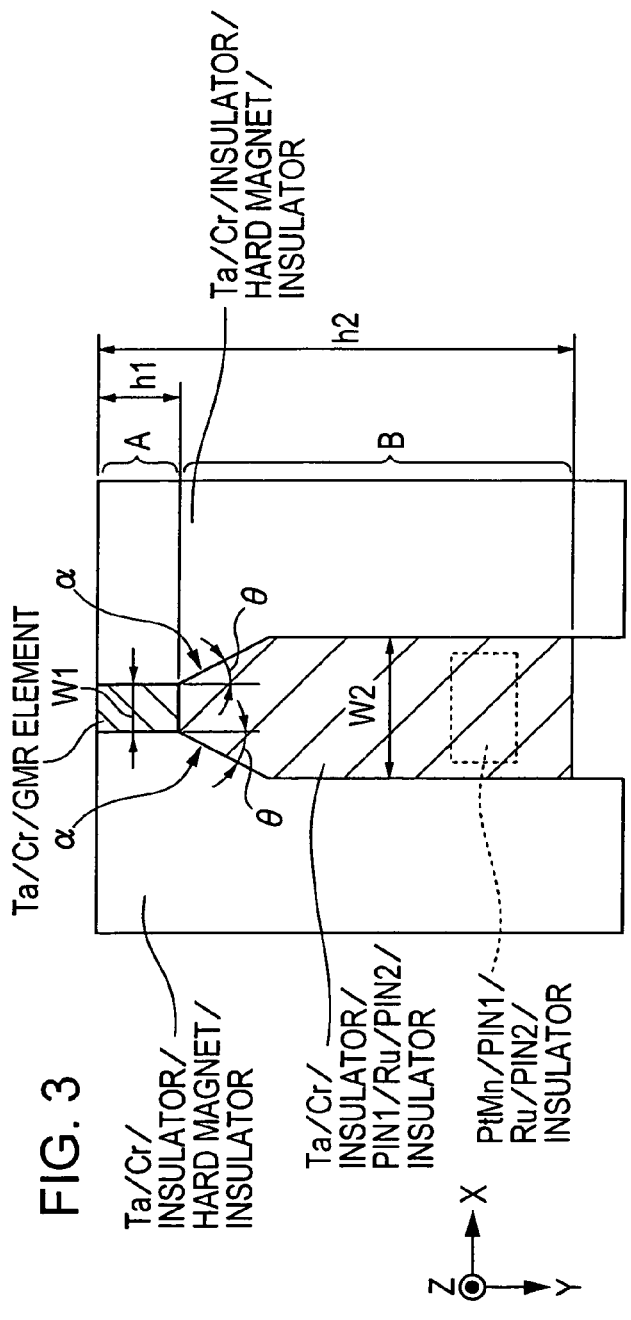
FIG. 3
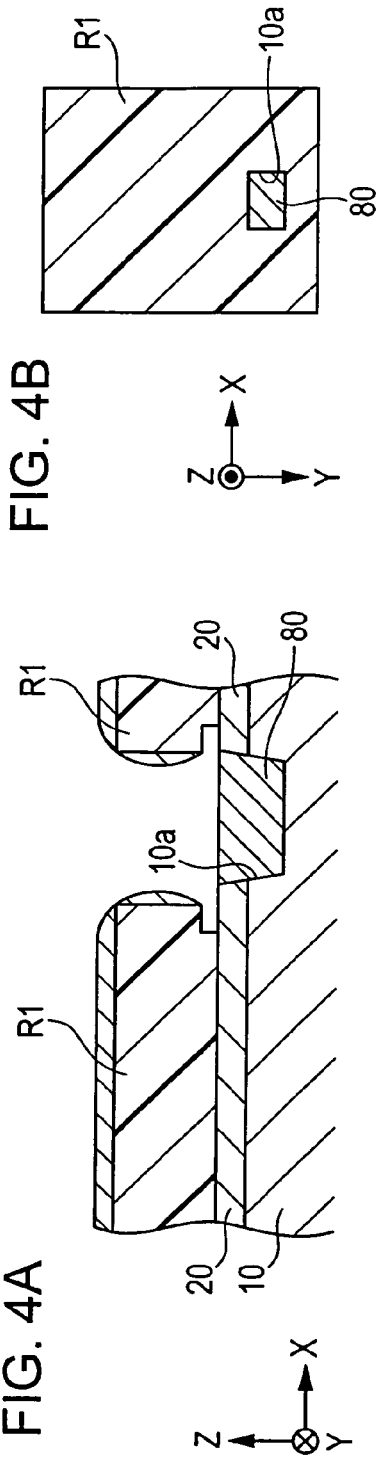
FIG. 4A
FIG. 4B

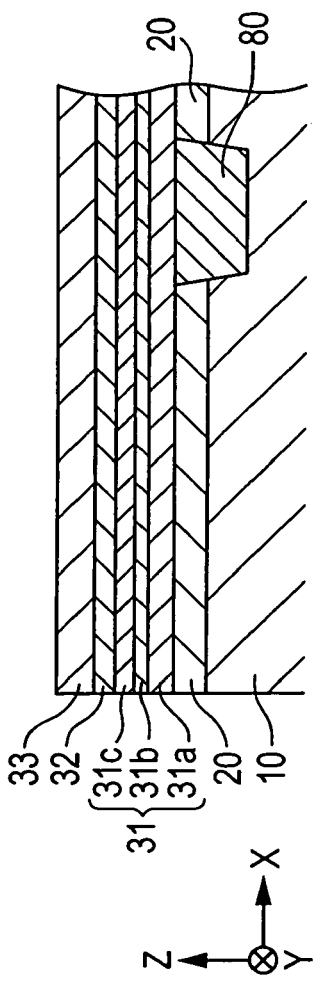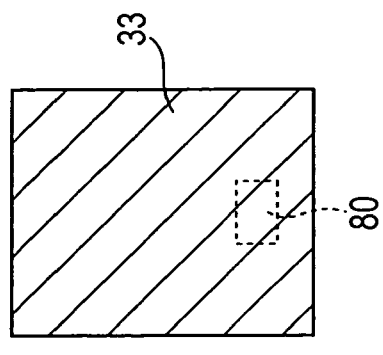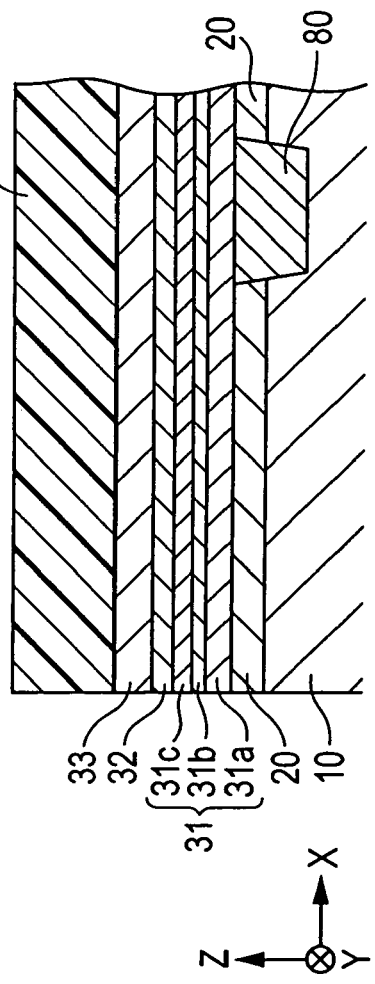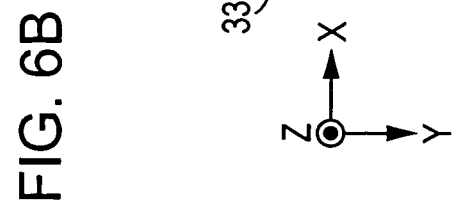

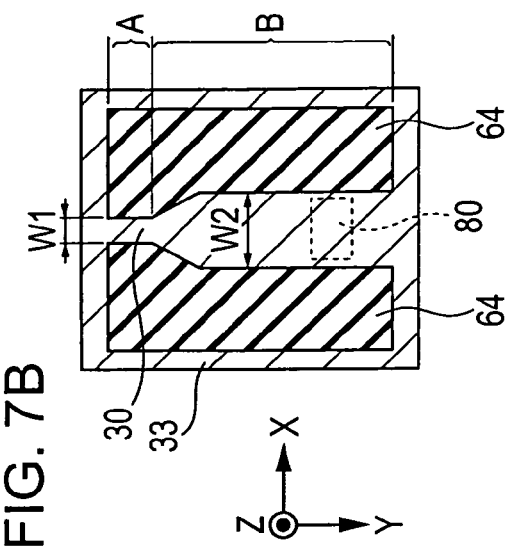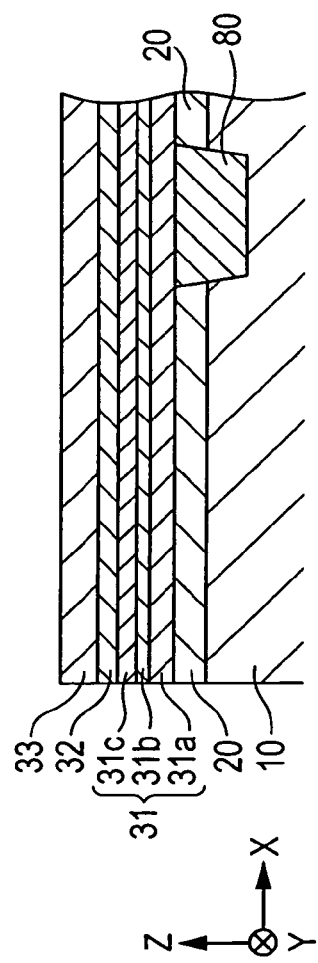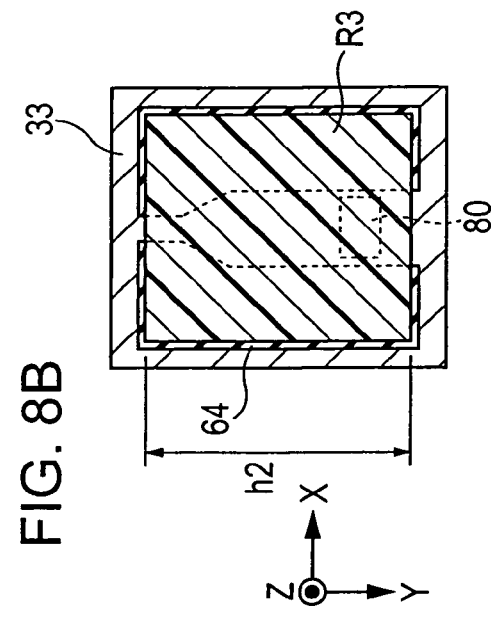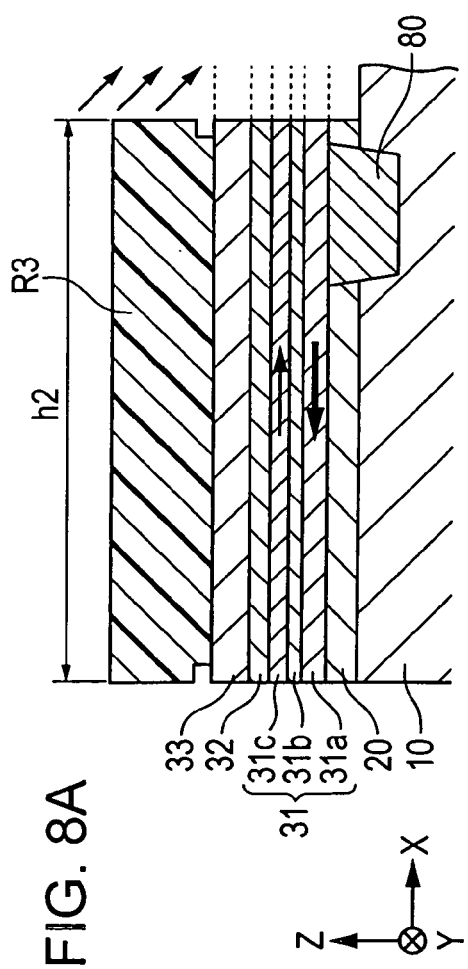

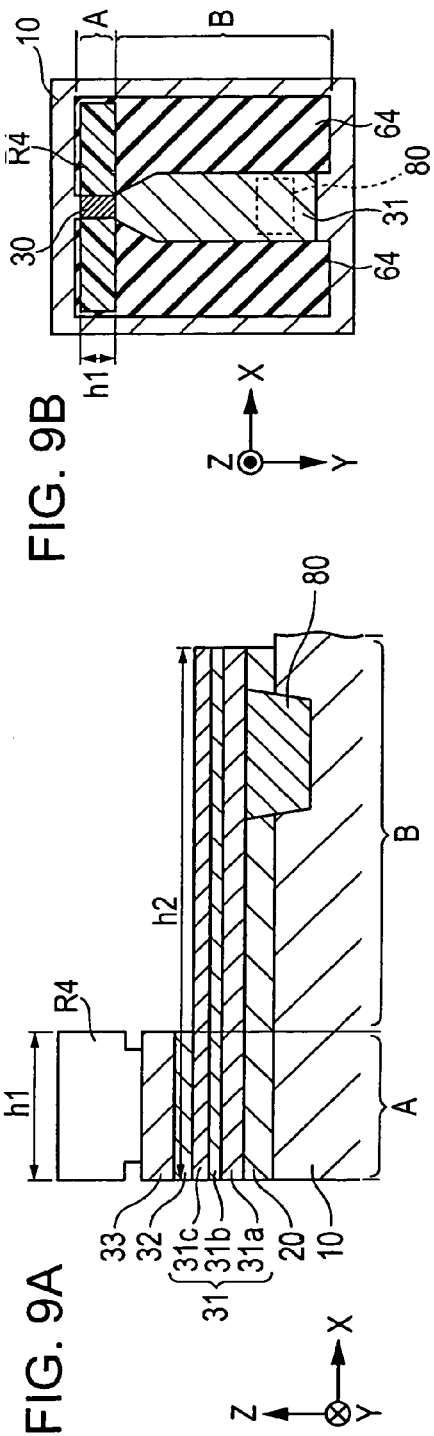
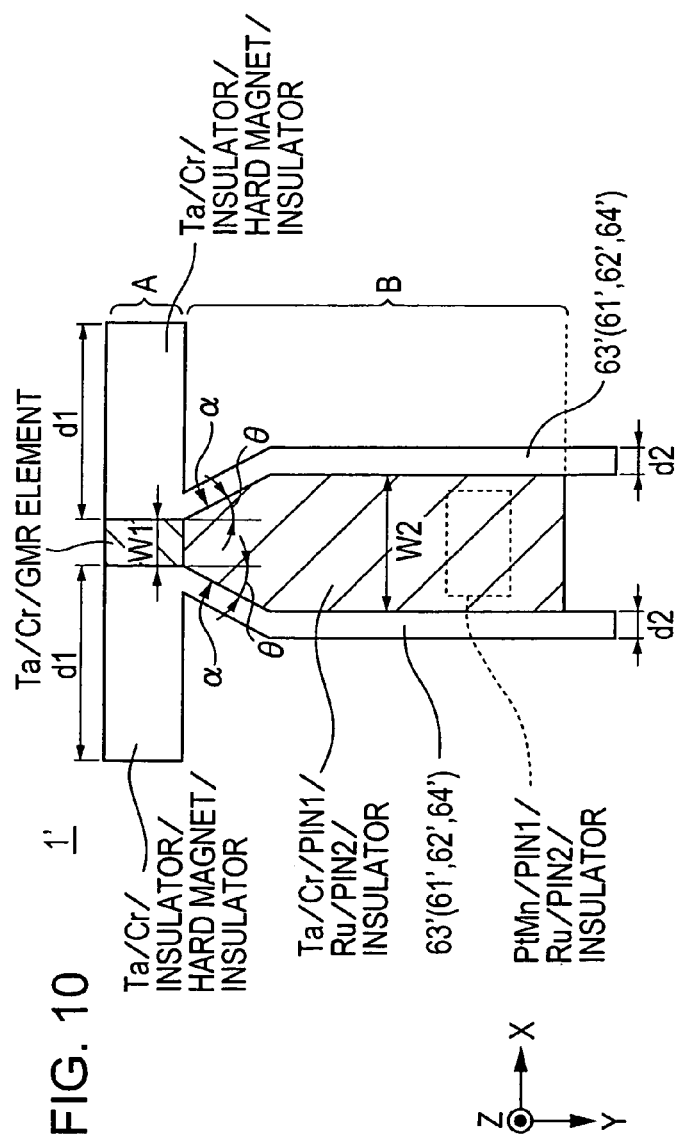
FIG. 9A
FIG. 9B
FIG. 10

# CPP GIANT MAGNETORESISTIVE HEAD INCLUDING PINNED MAGNETIC LAYER THAT EXTENDS IN THE HEIGHT DIRECTION

This application claims the benefit of priority to Japanese Patent Application No. 2004-167391 filed on Jun. 4, 2004, herein incorporated by reference.

BACKGROUND OF THE INVENTION

1. Field of the Invention

The present invention relates to a CPP giant magnetoresistive head in which a sense current flows in the thickness direction (direction orthogonal to the film surface).

2. Description of the Related Art

Giant magnetoresistive elements (GMR elements) used as thin-film magnetic heads can be broadly divided into a current-in-plane (CIP) mode element, in which a sense current flows in the direction parallel to a surface of a layer constituting the element; and a current-perpendicular-to-plane mode element, in which a sense current flows in the direction perpendicular to a surface of a layer constituting the element.

The following description is disclosed in Japanese Unexamined Patent Application Publication Nos. 2001-266313, 2001-307307, 2002-289945, 2002-305338, and 2003-31871, and U.S. Pat. No. 5,739,987. FIG. 12 is a longitudinal sectional view showing an example of a structure of a CPP-GMR head using a known CPP-GMR element. A CPP-GMR head 100 includes a lower shield layer 110 extending in the x-direction shown in the figure; a lower nonmagnetic metal layer 120 on the middle of the lower shield layer 110 in the x-direction; a free magnetic layer 133, a nonmagnetic material layer 132, pinned magnetic layers 131, an antiferromagnetic layer 134, and an upper nonmagnetic metal layer 140, stacked in that order on the lower nonmagnetic metal layer 120; an upper shield layer 150 extending in the x-direction on the upper nonmagnetic metal layer 140; longitudinal bias layers 163 in contact with both sides of the nonmagnetic material layer 132 and part of one of the free magnetic layers 133; insulating layers 161 between the longitudinal bias layer 163 and the lower shield layer 110; insulating layers 164 between the longitudinal bias layer 163 and the upper shield layer 150; and bias underlying layers 162 interposed between the insulating layer 161 and the longitudinal bias layer 163.

In the CPP-GMR head 100 having the above-described structure, the sense current also flows through the antiferromagnetic layer 134 composed of, for example, PtMn. The antiferromagnetic layer 134 has a resistivity of about 200 $\mu\Omega\cdot cm$, which is significantly greater than those of the nonmagnetic metal layers 120 and 140, the free magnetic layer 133, and the pinned magnetic layer 131. Moreover, the antiferromagnetic layer 134 is required to have a large thickness in order to retain the antiferromagnetic property. When the distance between the lower and upper shield layers is about 600 Å, the thickness of the antiferromagnetic layer 134 should be about 200 Å. Such a thick antiferromagnetic layer 134 having a high resistivity increases the resistance of the antiferromagnetic layer 134, thus resulting in heat generation when the sense current flows. This heat generation (Joule heat) causes an increase in the temperature of the entire head, thereby degrading the high frequency characteristics and reliability of the head. Furthermore, the thick antiferromagnetic layer 134 results in difficulty in reducing the distance between the lower and upper shield layers and is disadvantageous for higher recording density. In a CIP-GMR head, since only about ten percent of the total sense current flows through an antiferromagnetic layer and no sense current flows through a shield layer, there is no problem as described above.

Consequently, an element not including the antiferromagnetic layer has recently been proposed. For example, in Japanese Patent Application No. 2004-47757, the present inventors have proposed a structure in which the pinned magnetic layer extends in the height direction longer than the nonmagnetic material layer and the free magnetic layer, and the length of the element in the height direction is greater than the track width of the element. This structure results in shape anisotropy in the direction parallel to the height direction of the pinned magnetic layer. Therefore, it is possible to stabilize the magnetization direction of the pinned magnetic layer in the uniaxial direction parallel to the height direction without the antiferromagnetic layer that fixes the magnetization direction of the pinned magnetic layer.

In the above-described structure proposed by the inventors, the pinned magnetic layer preferably retains the track width of the element and extends in the height direction. However, in recent years, since the GMR element has a very small track width of about 0.2 μm or less, it is difficult to form a pinned magnetic layer extending in the height direction while maintaining such a narrow track width under present circumstances, thus degrading the yield. There is a process for independently forming a pinned magnetic layer in the GMR element and a pinned magnetic layer behind the GMR element in the height direction (at a portion behind the element in the height direction). However, since the track width is very narrow, it is difficult to accurately align the pinned magnetic layer in the element with the pinned magnetic layer in the portion behind the element in the height direction.

SUMMARY OF THE INVENTION

Accordingly, it is an object of the present invention to provide a CPP giant magnetoresistive head including a pinned magnetic layer extending beyond the element in the height direction, the pinned magnetic layer capable of being formed by a simple production process and thus improving yield.

The present invention is accomplished in view of the following two points: (1) a step of simultaneously forming pinned magnetic layers in the element and a pinned magnetic layer in the portion behind the element in the height direction that eliminates the need for alignment of the pinned magnetic layers; and (2) when extending the pinned magnetic layer in the height direction, an increase in the width of the pinned magnetic layer in the track-width direction in the portion behind the element in the height direction prevents the possibility of the breakage of the pinned magnetic layer at some midpoint.

The present invention provides a CPP giant magnetoresistive head including a lower shield layer; an upper shield layer; a giant magnetoresistive element between the lower shield layer and the upper shield layer, the giant magnetoresistive element including a nonmagnetic material layer; a pinned magnetic layer; and a free magnetic layer. The pinned magnetic layer and the free magnetic layer are laminated with the nonmagnetic layer provided therebetween, a current flowing perpendicularly to a film plane of the giant magnetoresistive element. The pinned magnetic layer extends in the height direction longer than in a track-width direction and includes a first portion in the element disposed above or below the nonmagnetic material layer and the free magnetic layer. A second portion is disposed behind the nonmagnetic material layer and the free magnetic layer in the height direction, the first portion and the second portion being in the same plane. The width of the pinned magnetic layer in the track-width direction in the first portion is greater than that in the second portion.

The second portion preferably includes a slope section where the width of the pinned magnetic layer in the track-width direction is increased from the first portion toward the second portion. The angle of inclination of the slope section is preferably 5° to 45° with respect to a side face along the height direction in the first portion. The width of the pinned magnetic layer in the track-width direction increases with the angle of inclination at the slope section of the pinned magnetic layer in the second portion. An angle of inclination ranging from 5° to 45° is the most ideal. When the angle of inclination is less than 5°, the width of the pinned magnetic layer in the track-width direction in the second portion becomes too small; hence, it is difficult to form such a layer in the present circumstances. When the angle of inclination is above 45°, the width of the pinned magnetic layer in the track-width direction in the second portion becomes too large; hence, it is difficult to put the pinned magnetic layer into a single magnetic domain state.

The CPP giant magnetoresistive head described above preferably includes a pair of longitudinal bias layers in contact with both sides of the giant magnetoresistive element along the height direction and an applied longitudinal bias magnetic field to the free magnetic layer. The width of each longitudinal bias layer in the track-width direction in the second portion is preferably smaller than that in the first portion. The pair of longitudinal bias layers, each having a controllable minimum width in the track-width direction, is preferably provided at the second portion. Decreases in the widths of the longitudinal bias layers disposed at both sides of the second portion result in a reduction in the intensity of the longitudinal bias magnetic field that exerts an effect on the magnetization of the pinned magnetic layer in the second portion because of a demagnetizing field, thereby reducing magnetic fluctuations of the pinned magnetic layer in the second portion.

The pinned magnetic layer is preferably composed of a magnetic material having a positive magnetostriction constant, and the end of the pinned magnetic layer is preferably exposed at a surface facing a storage medium. In this case, the symmetry of stress two-dimensionally and isotropically applied to the pinned magnetic layer is broken. Thus, a uniaxial tensile stress is applied to the pinned magnetic layer in the direction parallel to the height direction. This inverse-magnetostrictive effect causes the magnetization of the pinned magnetic layer to be stabilized in the uniaxial direction parallel to the height direction.

The present invention provides a CPP giant magnetoresistive head including a pinned magnetic layer extending beyond the element in the height direction, the pinned magnetic layer capable of being formed by a simple production step and thus improving yield.

BRIEF DESCRIPTION OF THE DRAWINGS

FIG. 3 is a schematic plan view of the CPP-GMR head when viewed from above;

FIG. 4A is a fragmentary sectional view taken along the direction parallel to the height direction through the center of the element for illustrating a step in a method for producing the CPP-GMR head shown in FIG. 1;

FIG. 4B is a schematic plan view illustrating a step in a method for producing the CPP-GMR head 1 when viewed from above;

FIG. 5A is a fragmentary sectional view taken along the direction parallel to the height direction through the center of the element for illustrating a step subsequent to the step shown in FIG. 4A;

FIG. 5B is a schematic plan view illustrating a step in a method for producing the CPP-GMR head 1 subsequent to the step shown in FIG. 4B when viewed from above;

FIG. 6A is a fragmentary sectional view taken along the direction parallel to the height direction through the center of the element for illustrating a step subsequent to the step shown in FIG. 5A;

FIG. 6B is a schematic plan view illustrating a step in a method for producing the CPP-GMR head 1 subsequent to the step shown in FIG. 5B when viewed from above;

FIG. 7A is a fragmentary sectional view taken along the direction parallel to the height direction through the center of the element for illustrating a step subsequent to the step shown in FIG. 6A;

FIG. 7B is a schematic plan view illustrating a step in a method for producing the CPP-GMR head 1 subsequent to the step shown in FIG. 6B when viewed from above;

FIG. 8A is a fragmentary sectional view taken along the direction parallel to the height direction through the center of the element for illustrating a step subsequent to the step shown in FIG. 7A;

FIG. 8B is a schematic plan view illustrating a step in a method for producing the CPP-GMR head 1 subsequent to the step shown in FIG. 7B when viewed from above;

FIG. 9A is a fragmentary sectional view taken along the direction parallel to the height direction through the center of the element for illustrating a step subsequent to the step shown in FIG. 8A;

FIG. 9B is a schematic plan view illustrating a step in a method for producing the CPP-GMR head 1 subsequent to the step shown in FIG. 8B when viewed from above;

FIG. 10 is a schematic plan view of the CPP-GMR head according to a second embodiment of the present invention when viewed from above;

DESCRIPTION OF THE PREFERRED EMBODIMENTS

The present invention will be described based on the drawings. In the respective drawings, the x-direction is a track-width direction. The y-direction is the height direction (direction of leakage flux from a storage medium) of the GMR element. The z-direction is the direction to which the storage medium moves and the stacking direction of layers constituting the GMR element.

Figure 1:
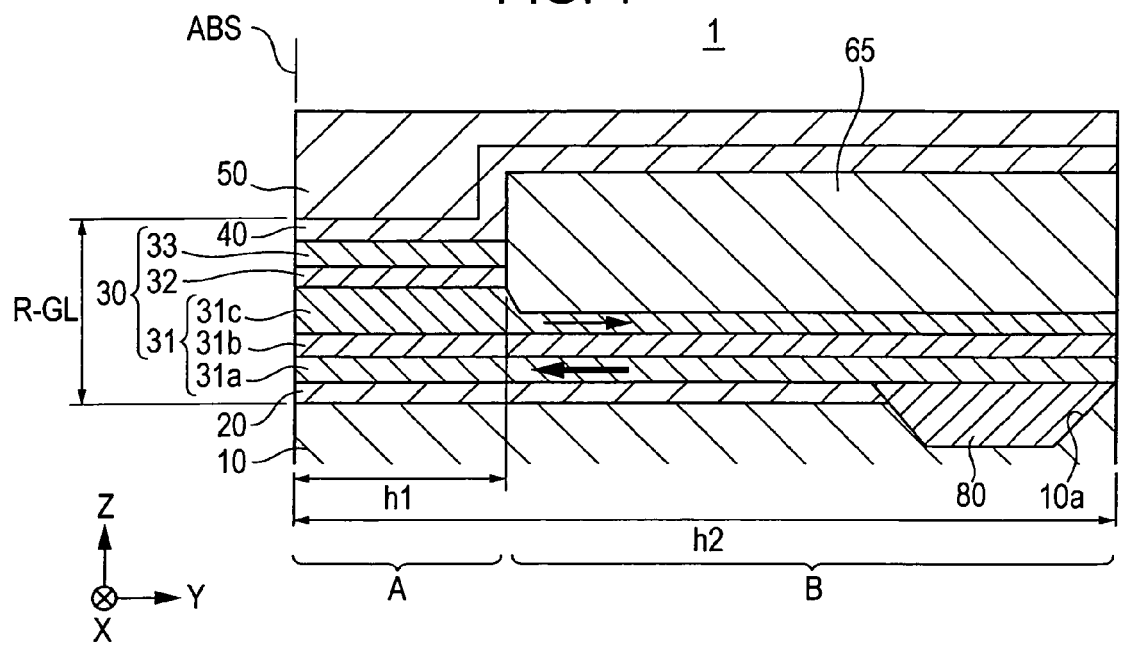
FIG. 1 is a fragmentary sectional view through the center of the element of a CPP giant magnetoresistive head (CPP-GMR head) according to a first embodiment of the present invention.
Figure 2:
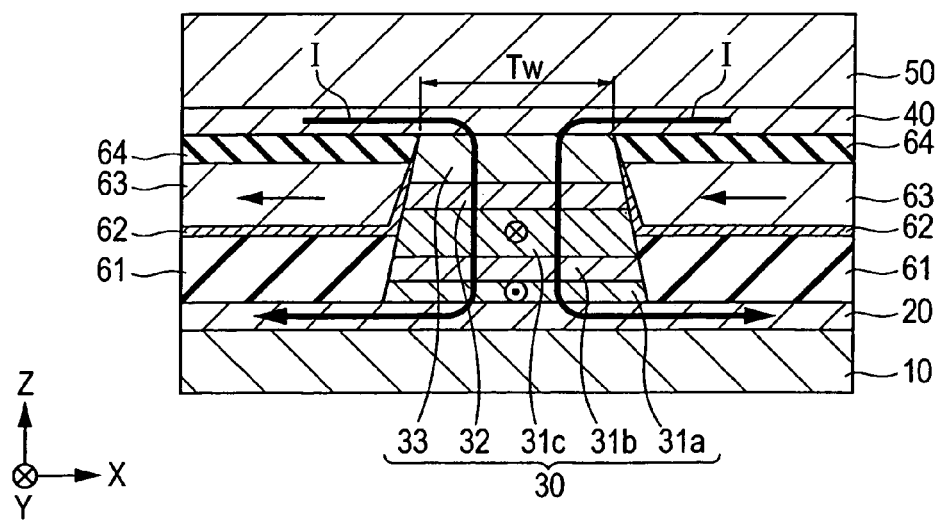
FIG. 2 is a fragmentary plan view of the CPP-GMR head when viewed from the surface facing a storage medium.

FIGS. 1 to 9B each show a first embodiment of a CPP giant magnetoresistive head (hereinafter referred to as "CPP-GMR head") according to the present invention. FIG. 1 is a fragmentary sectional view through the center of a CPP-GMR head 1. FIG. 2 is a fragmentary plan view of the CPP-GMR head 1 when viewed from the surface facing a storage medium. FIG. 3 is a schematic plan view of a GMR element 30 when viewed from above.

The CPP-GMR head 1 includes a large-area lower nonmagnetic metal film 20, the GMR element 30 exhibiting the giant magnetoresistive effect, and a large-area upper nonmagnetic metal film 40 between a lower shield layer 10 and an upper shield layer 50, the lower shield layer 10 and the upper shield layer 50 being disposed at a predetermined interval R-GL between the shield layers in the z-direction shown in the figure.

As shown in FIGS. 1 and 2, the lower shield layer 10 and the upper shield layer 50 each function as both a magnetic shield and an electrode and each have an area sufficiently larger than that of the GMR element 30. The lower shield layer 10 and the upper shield layer 50 are each composed of a soft magnetic material that exhibits a satisfactory magnetic shielding effect, for example, an iron-nickel alloy (NiFe) and each have a thickness of about 1 μm.

The large-area lower nonmagnetic metal film 20 is a gap layer directly on the lower shield layer 10 and also functions as an electrode and as a seed layer for regularly forming the GMR element 30. The large-area upper nonmagnetic metal film 40 is a gap layer directly below the upper shield layer 50 and also functions as an electrode together with the upper shield layer 50.

As shown in FIGS. 1 and 2, the large-area lower nonmagnetic metal film 20 is in direct contact with the bottom surface of the GMR element 30 (surface of a first pinned magnetic sublayer 31a) and has an area larger than that of the GMR element 30 and substantially the same area as those of the lower shield layer 10. The large-area upper nonmagnetic metal film 40 is in direct contact with the top surface of the GMR element 30 (surface of a free magnetic layer 33) and has an area larger than that of the GMR element 30 and substantially the same area as that of the upper shield layer 50.

The large-area lower nonmagnetic metal film 20 is composed of a nonmagnetic metal material having a resistivity lower than that of the lower shield layer 10. The large-area upper nonmagnetic metal film 40 is composed of a nonmagnetic metal material having a resistivity lower than that of the upper shield layer 50. The large-area lower nonmagnetic metal film 20 and the large-area upper nonmagnetic metal film 40 are preferably composed of at least one element selected from the group consisting of Au, Ag, Cu, Ru, Ir, Pd, Ni—Cr, (Ni—Fe)—Cr, and Cr. When the material used contains Cr, the Cr content preferably exceeds 20 atomic percent. Each of the large-area lower nonmagnetic metal film 20 and large-area upper nonmagnetic metal film 40 may be a single layer film or a laminated film. The large-area lower nonmagnetic metal film 20 also functions as a seed layer of the GMR element 30 and thus is preferably formed of, for example, a Ta layer/a Cu layer, a Ta layer/a Ru layer/a Cu layer, a Ta layer/a Cr layer, a Ta layer/a Ni—Cr layer, a Ta layer/a (Ni—Fe)—Cr layer, or a Cr layer. In this embodiment, the large-area lower nonmagnetic metal film 20 is formed of a Ta layer/a Cr layer (two-layer structure).

The large-area lower nonmagnetic metal film 20 and the large-area upper nonmagnetic metal film 40 each have a thickness of ¼ or more of the interval R-GL between the shield layers. For example, when the interval R-GL between the shield layers is 480 to 800 Å, each of the large-area lower nonmagnetic metal film 20 and the large-area upper nonmagnetic metal film 40 preferably has a thickness of 60 to 300 Å. In this range, the resistivity of each of the large-area lower nonmagnetic metal film 20 and the large-area upper nonmagnetic metal film 40 can be reduced to about ⅕ to ¹/₁₀ of that of the NiFe alloy for constituting the lower shield layer 10 and the upper shield layer 50. That is, the sheet resistance of each of the large-area lower nonmagnetic metal film 20 and the large-area upper nonmagnetic metal film 40, each having a thickness of 60 to 300 Å, corresponds to the sheet resistance of a NiFe film having a thickness of 300 to 3000 Å. Since a sense current readily flows through the large-area lower nonmagnetic metal film 20 and the large-area upper nonmagnetic metal film 40, it is possible to relieve the concentration of the current at the interfaces between the large-area lower nonmagnetic metal film 20 and the lower shield layer 10 and between the large-area upper nonmagnetic metal film 40 and the upper shield layer 50. Therefore, a variation in the resistance of each of the lower shield layer 10 and the upper shield layer 50 due to an anisotropic magnetoresistive effect (AMR effect) can be kept low. The thickness of the large-area lower nonmagnetic metal film 20 and the thickness of the large-area upper nonmagnetic metal film 40 may be the same or different.

As shown in FIG. 2, the GMR element 30 is disposed at almost the middle of the lower shield layer 10, the upper shield layer 50, the large-area lower nonmagnetic metal film 20, and the large-area upper nonmagnetic metal film 40 in the track-width direction (the x-direction shown in the figure). The bottom surface and the top surface of the GMR element 30 are in contact with the large-area lower nonmagnetic metal film 20 and the large-area upper nonmagnetic metal film 40, respectively. The GMR element 30 has a thickness of ¾ or less of the interval R-GL between the shield layers because each of the large-area lower nonmagnetic metal film 20 and the large-area upper nonmagnetic metal film 40 has a thickness of ¼ or more of the interval R-GL between the shield layers.

The GMR element 30 includes a pinned magnetic layer 31, a nonmagnetic material layer 32, and a free magnetic layer 33, provided in that order from the large-area lower nonmagnetic metal film 20. The GMR element 30 may include the pinned magnetic layer, the nonmagnetic material layer, and the free magnetic layer, provided in that order from the top, which is in the inverse order to the order shown in FIG. 2. A seed layer may be provided directly below the pinned magnetic layer 31, and a cap layer may be provided directly on the free magnetic layer 33 (not shown).

As shown in FIGS. 1 and 3, the pinned magnetic layer 31 extends longer than the nonmagnetic material layer 32 and the free magnetic layer 33 in the height direction, and includes a first portion A below the nonmagnetic material layer 32 and the free magnetic layer 33 and a second portion B behind the nonmagnetic material layer 32 and the free magnetic layer 33 in the height direction, the first portion A and the second portion B being in the same plane. The first portion A of the pinned magnetic layer 31 is part of the GMR element 30 and has the same area as that of the GMR element 30 (track width: W1, height: h1). The second portion B of the pinned magnetic layer 31 includes at least one slope section a where the width of the pinned magnetic layer 31 along the track-width direction is increased from the first portion A toward the second portion B, a width W2 of the pinned magnetic layer 31 in the second portion B in the track-width direction being greater than the width W1 of the pinned magnetic layer 31 in the first portion A in the track-width direction. In the slope section α, the angle of inclination θ is 5° to 45° with respect to a side face along the height direction in the first portion A. An increase in the angle of inclination θ results in an increase in width W2 of the pinned magnetic layer 31 in the second portion B in the track-width direction. As shown in FIG. 3, the pinned magnetic layer 31 has a bottle shape having its neck corresponding to the first portion A, in plan view.

The pinned magnetic layer 31 has a laminated ferrimagnetic structure including the first pinned magnetic sublayer 31a, a second pinned magnetic sublayer 31c, which are each composed of a magnetic material, and a nonmagnetic intermediate sublayer 31b provided between the first pinned magnetic sublayer 31a and the second pinned magnetic sublayer 31c and composed of a nonmagnetic material. As shown in FIG. 3, in the pinned magnetic layer 31, the height (length in the height direction) h2 is greater than the track widths W1 and W2. In this way, the pinned magnetic layer 31 extends in the height direction greater than in the track-width direction. This results in shape anisotropy in the first pinned magnetic sublayer 31a and the second pinned magnetic sublayer 31c in the direction parallel to the height direction. Therefore, it is possible to stabilize the magnetization direction of the first pinned magnetic sublayer 31a and the second pinned magnetic sublayer 31c in the uniaxial direction parallel to the height direction.

The first pinned magnetic sublayer 31a is in contact with an antiferromagnetic layer 80 embedded in the large-area lower nonmagnetic metal film 20 and the lower shield layer 10 behind the GMR element 30 in the height direction. The antiferromagnetic layer 80 generates an exchange coupling magnetic field between the first pinned magnetic sublayer 31a and the antiferromagnetic layer 80. As a result, the magnetization direction of the first pinned magnetic sublayer 31a is tightly fixed along the height direction. The antiferromagnetic layer 80 is preferably composed of an antiferromagnetic material containing Mn and Z, wherein Z is at least one element selected from the group consisting of Pt, Pd, Ir, Rh, Ru, and Os. Alternatively, The antiferromagnetic layer 80 is preferably composed of an antiferromagnetic material containing Mn and Z', wherein Z' is at least one element selected from the group consisting of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Sn, Hf, Ta, W, Re, Au, Pb, and rare-earth elements. Such antiferromagnetic materials exhibit superior corrosion resistance and high blocking temperatures and can generate large exchange coupling magnetic fields at the interface between the antiferromagnetic layer 80 and the first pinned magnetic sublayer 31a. The antiferromagnetic layer 80 preferably has a thickness of 80 to 300 Å. In this embodiment, the antiferromagnetic layer 80 has a thickness of about 150 Å. The antiferromagnetic layer 80 may not be provided.

The magnetization directions of the first pinned magnetic sublayer 31a and the second pinned magnetic sublayer 31c are aligned antiparallel to each other due to the RKKY interaction via the nonmagnetic intermediate sublayer 31b. The magnetization of the second pinned magnetic sublayer 31c is directed in the height direction. In this embodiment, since the magnetic moment per unit area (saturation magnetization Ms×thickness t) of the pinned magnetic layer 31 is greater than that of the second pinned magnetic sublayer 31c, the magnetization direction of the entire pinned magnetic layer 31 is identical to the magnetization direction of the first pinned magnetic sublayer 31a. In FIG. 1, the magnetization direction of the first pinned magnetic sublayer 31a is indicated by the bold arrow, and the magnetization direction of the second pinned magnetic sublayer 31c is indicated by the thin arrow.

As shown in FIG. 1, the pinned magnetic layer 31 is composed of a magnetic material having a positive magnetostriction constant, and the end of the pinned magnetic layer is exposed at a surface facing a storage medium (air bearing surface, (ABS)). Therefore, the symmetry of stress two-dimensionally and isotropically applied to the pinned magnetic layer 31 is broken. Thus, a uniaxial tensile stress is applied to the pinned magnetic layer 31 in the direction parallel to the height direction. This inverse-magnetostrictive effect causes the magnetization of the pinned magnetic layer 31 to be stabilized in the uniaxial direction parallel to the height direction.

Each of the first pinned magnetic sublayer 31a and the second pinned magnetic sublayer 31c is partially or entirely composed of Fe—Co—Cu (wherein Fe>10 atomic percent, Co>30 atomic percent, and Cu>5 atomic percent), Fe—Co—Cu—X (wherein X is at least one element of Pt, Pd, Mn, Si, Au, and Ag), or $Co_2MnY$ (wherein Y is at least one element of Ge, Si, Sn, and Al). The first pinned magnetic sublayer 31a and the second pinned magnetic sublayer 31c each have a thickness of about 10 to 70 Å. The material for the nonmagnetic intermediate sublayer 31b and the thickness of the nonmagnetic intermediate sublayer 31b is determined so that the RKKY interaction occurs between the first pinned magnetic sublayer 31a and the second pinned magnetic sublayer 31c. The nonmagnetic intermediate sublayer 31b in this embodiment is composed of ruthenium (Ru) and has a thickness of about 3 to 10 Å. The pinned magnetic layer 31 may have a monolayer structure or a laminated structure instead of the laminated ferrimagnetic structure.

The nonmagnetic material layer 32 is preferably composed of a low-resistant conductive material. In this embodiment, the nonmagnetic material layer 32 is composed of copper (Cu). The nonmagnetic material layer 32 has a thickness of about 25 Å. The free magnetic layer 33 is partially or entirely composed of Fe—Co—Cu (wherein Fe>10 atomic percent, Co>30 atomic percent, and Cu>5 atomic percent), Fe—Co—Cu—X (wherein X is at least one element of Pt, Pd, Mn, Si, Au, and Ag), or $Co_2MnY$ (wherein Y is at least one element of Ge, Si, Sn, and Al). The free magnetic layer 33 has a thickness of, for example, about 100 Å. The free magnetic layer 33 is formed of a single magnetic film. However, the free magnetic layer 33 may have a laminated structure or a laminated ferrimagnetic structure, which include a magnetic film. A backfill gap layer 65 is provided behind the nonmagnetic material layer 32 and the free magnetic layer 33 in the height direction, the backfill gap layer 65 being interposed between the pinned magnetic layer 31 (second pinned magnetic sublayer 31c) and the large-area upper nonmagnetic metal film 40. The backfill gap layer 65 is composed of, for example, an insulating material such as $Al_2O_3$ or $SiO_2$.

Longitudinal bias layers 63 are in contact with both sides of each of the free magnetic layer 33 and the nonmagnetic material layer 32, the longitudinal bias layer 63 being magnetized in the track-width direction. First insulating layers 61 and second insulating layers 64 each have a thickness of several to several tens of angstroms. The first insulating layer 61 and the second insulating layer 64 may be interposed between the longitudinal bias layer 63 and the GMR element 30. The magnetization of the free magnetic layer 33 is aligned in the track-width direction (the x-direction shown in the figure) because of the longitudinal bias magnetic field due to the longitudinal bias layers 63. The arrows shown in FIG. 2 indicate the directions of the longitudinal bias magnetic field due to the longitudinal bias layers 63.

Between the large-area lower nonmagnetic metal film 20 and the large-area upper nonmagnetic metal film 40, the first insulating layers 61, bias underlying layers 62, the longitudinal bias layers 63, and the second insulating layers 64 are provided at both sides of the GMR element 30 along the height direction, in that order from the large-area lower nonmagnetic metal film 20. The first insulating layers 61 and the second insulating layers 64 are each composed of, for example, an insulating material such as $Al_2O_3$ or $SiO_2$. Each first insulating layer 61 is interposed between the corresponding longitudinal bias layer 63 (and the bias underlying layer 62) and the large-area lower nonmagnetic metal film 20. Each second insulating layer 64 is interposed between the corresponding longitudinal bias layer 63 and the large-area upper nonmagnetic metal film 40. The first insulating layers 61 are provided on the large-area lower nonmagnetic metal film 20 and each have a thickness so as to be in contact with the corresponding side face of the pinned magnetic layer 31. The second insulating layers 64 are provided on the respective longitudinal bias layers 63 and each have a thickness so as to be in contact with part of the corresponding side face of the free magnetic layer 33. The bias underlying layers 62 are provided for improving the magnetic properties of the longitudinal bias layers 63 (coercive force Hc, remanence ratio S) and increasing the bias magnetic field generated by the longitudinal bias layers 63. Each of the bias underlying layer 62 is preferably formed of a metal film having a body-centered cubic structure (bcc structure) and is preferably composed of at least one element selected from the group consisting of Cr, W, Mo, V, Mn, Nb, and Ta. The bias underlying layers 62 are preferably provided only under the respective longitudinal bias layers 63. However, each bias underlying layer 62 having a significantly small thickness may be interposed between the corresponding side face of the free magnetic layer 33 and longitudinal bias layer 63. Such a bias underlying layer 62 provided between the corresponding side face of the free magnetic layer 33 and longitudinal bias layer 63 preferably has a thickness of 1 nm or less. By interposing the bias underlying layer 62, the longitudinal bias layer 63 and the free magnetic layer 33 can be magnetically coupled to form a magnetic continuum. Therefore, a buckling phenomenon, in which the ends of the free magnetic layer 33 are affected by a demagnetizing field, can be prevented, thus facilitating control of the magnetic domains in the free magnetic layer 33.

The CPP-GMR head 1 detects a leakage field from a storage medium using a giant magnetoresistive effect of the GMR element 30 when a sense current flows perpendicularly to the film surface in the GMR element 30 (thickness direction). FIG. 2 shows current paths I when a sense current flows from the upper shield layer 50 to the lower shield layer 10.

Most of the sense current fed from the upper shield layer 50 enters the large-area upper nonmagnetic metal film 40 having a resistivity lower than that of the upper shield layer 50, and flows through the large-area upper nonmagnetic metal film 40 in parallel to the film surface. After flowing from the interface between the large-area upper nonmagnetic metal film 40 and the free magnetic layer 33 to the direction orthogonal to the film surfaces in the GMR element 30 (thickness direction), the sense current enters the large-area lower nonmagnetic metal film 20 from the interface between the pinned magnetic layer 31 and the large-area lower nonmagnetic metal film 20. Since the large-area lower nonmagnetic metal film 20 has a resistivity lower than that of the lower shield layer 10 and extends wider than the GMR element 30, most of the sense current flow through the large-area lower non magnetic metal film 20 is in parallel to the film surface. That is, the sense current hardly flows through the lower shield layer 10 below the GMR element 30. Then, the sense current passing through the large-area lower nonmagnetic metal film 20 in parallel to the film surface detours around the antiferromagnetic layer 80 embedded in the large-area lower nonmagnetic metal film 20 and the lower shield layer 10 behind the GMR element 30 in the height direction, and enters the lower shield layer 10.

In the current path I described above, since the sense current is not concentrated above or below the GMR element 30, noise from the lower shield layer 10 and the upper shield layer 50 due to an anisotropic magnetoresistive effect (AMR effect), i.e., changes in the resistance of the shield layers 10 and 50 can be kept low. In addition, since the sense current does not flow through the antiferromagnetic layer 80, an excessive increase in the temperature of the head does not occur. Therefore, reliability and high frequency characteristics of the head are improved. When the sense current flows from the lower shield layer 10 toward the upper shield layer 50, although the sense current flows in the reverse direction, the current path is the same as above.

An embodiment of a method for producing the CPP-GMR head 1 shown in FIGS. 1 to 3 will be described with reference to FIGS. 4A to 9B. FIGS. 4A, 5A, 6A, 7A, 8A, and 9A each are a fragmentary sectional view taken along the direction parallel to the height direction through the center of the element for illustrating a step in a method for producing the CPP-GMR head 1. FIGS. 4B, 5B, 6B, 7B, 8B, and 9B each are a schematic plan view illustrating a step in a method for producing the CPP-GMR head 1 when viewed from above. The description of the material for the layers and the thicknesses of the layers are omitted because the materials and the thicknesses are identical to those of the complete CPP-GMR head 1.

The lower shield layer 10 and the large-area lower nonmagnetic metal film 20 are successively formed by sputtering. A first resist layer R1 shown in FIG. 4A is formed on the large-area lower nonmagnetic metal film 20. The large-area lower nonmagnetic metal film 20 and part of the lower shield layer 10, which are present at a region behind the first resist layer R1 in the height direction, are removed by, for example, ion milling to form a recess 10a. The antiferromagnetic layer 80 is formed in the recess 10a. The amounts of ion milling of the large-area lower nonmagnetic metal film 20 and the lower shield layer 10 is optimized so that the top surface of the antiferromagnetic layer 80 having a thickness of 80 to 300 Å is coplanar with the top surface of the large-area lower nonmagnetic metal film 20. After formation of the antiferromagnetic layer 80, the first resist layer R1 is removed by lift-off processing. In this step, the antiferromagnetic layer 80 is provided in the large-area lower nonmagnetic metal film 20 and the lower shield layer 10 behind the GMR element in the height direction.

As shown in FIGS. 5A and 5B, the first pinned magnetic sublayer 31a, the nonmagnetic intermediate sublayer 31b, the second pinned magnetic sublayer 31c, the nonmagnetic material layer 32, and the free magnetic layer 33 are successively formed on the large-area lower nonmagnetic metal film 20 and the antiferromagnetic layer 80 in the form of a solid film by sputtering in vacuum.

As shown in FIGS. 6A and 6B, a second resist layer R2 is formed on the free magnetic layer 33, the second resist layer R2 determining the track width W1 of the GMR element (width of the first portion A of the pinned magnetic layer 31 in the track-width direction) and a width W2 of the second portion B in the track-width direction at the same time.

With respect to the second resist layer R2, the width W2 of the second portion B in the track-width direction is set greater than the track width W1 of the first portion A. The track width W1 of the first portion A is preferably about 0.2 μm or less. The width W2 of the second portion B in the track-width direction is preferably about 0.3 to 0.6 μm. The width W2 of the second portion B in the track-width direction is determined depending on the angle of inclination θ of the slope section a where the width in the track-width direction is increased from the first portion A toward the height direction. The width W2 of the second portion B in the track-width direction is optimized when the angle of inclination θ is in the range of 5° to 45° with respect to a side face along the height direction in the first portion A. An angle of inclination θ ranging from 5° to 45° is ideal. When the angle of inclination θ is below 5°, the width W2 of the second portion B in the track-width direction becomes too small; hence, it is difficult to form such a layer in the present circumstances. When the angle of inclination is above 45°, the width W2 of the second portion B in the track-width direction becomes too large; hence, it is difficult to put the pinned magnetic layer 31 into a single magnetic domain state.

After formation of the second resist layer R2, those layers from the free magnetic layer 33 to the large-area lower nonmagnetic metal film 20, which are not covered with the second resist layer R2, are removed by ion milling. In this step, the GMR element 30, which includes from the first pinned magnetic sublayer 31a to the free magnetic layer 33, which is almost trapezoidal in cross section, and which has a width W1 at the surface facing a storage medium remains at almost the middle of the large-area lower nonmagnetic metal film 20 in the track-width direction. The width of each layer constituting the GMR element 30 in the track-width direction in the first portion A is larger than that in the second portion B (W1<W2). Since some of the materials have been removed by ion milling are redeposited on both end faces of the GMR element 30, these redeposited materials are preferably removed again by ion milling.

Subsequently, while the second resist layer R2 remains, the first insulating layers 61, the bias underlying layers 62, the longitudinal bias layers 63, and the second insulating layers 64 are successively formed by sputtering so that each of the layers is in contact with both end faces of the GMR element 30 in the track-width direction. Then, the second resist layer R2 is removed. FIGS. 7A and 7B each show the state after removing the second resist layer R2.

The GMR element 30 is annealed in a magnetic field applied in the height direction (the y-direction shown in the figure) to generate an exchange coupling magnetic field between the antiferromagnetic layer 80 and the first pinned magnetic sublayer 31a. The annealing temperature is, for example, about 270° C., and the intensity of the applied magnetic field is about 800 kA/m. By the annealing in the magnetic, the magnetization direction of the second pinned magnetic sublayer 31c is fixed to the height direction, and the first pinned magnetic sublayer 31a is fixed to the direction antiparallel to the height direction.

As shown in FIGS. 8A and 8B, a third resist layer R3 for determining the height h2 of the pinned magnetic layer 31 is formed on the free magnetic layer 33 and the second insulating layers 64. Those layers from the free magnetic layer 33 and the second insulating layers 64 to the large-area lower nonmagnetic metal film 20, which are not covered with the third resist layer R3, are removed, and then the third resist layer R3 is removed. The lower shield layer 10 is exposed by removing those layers from the free magnetic layer 33 and the second insulating layers 64 to the large-area lower nonmagnetic metal film 20. This step can be omitted.

As shown in FIGS. 9A and 9B, after removal of the third resist layer R3, a fourth resist layer R4 for determining the height h1 of the GMR element 30 (height of the first portion A of the pinned magnetic layer 31) is formed on the free magnetic layer 33.

The free magnetic layer 33 and the nonmagnetic material layer 32, which are not covered with the fourth resist layer R4 are removed by, for example, ion milling. The backfill gap layer 65 is formed at the portion exposed by the removal. By the ion milling step, only the free magnetic layer 33 and the nonmagnetic material layer 32 in the first portion to be the GMR element 30 remain. The sublayers (the first pinned magnetic sublayer 31a, the nonmagnetic intermediate sublayer 31b, and the second pinned magnetic sublayer 31c) constituting the pinned magnetic layer 31 remain in a state in which the sublayers extend in the height direction compared with the free magnetic layer 33 and the nonmagnetic material layer 32. The end faces of the free magnetic layer 33, the nonmagnetic material layer 32, and part of the second pinned magnetic sublayer 31c in the height direction are smoothly continuous. The thickness of the second pinned magnetic sublayer 31c in the second portion B is slightly lower than that in the first portion A.

The large-area upper nonmagnetic metal film 40 is formed on the free magnetic layer 33, the second insulating layer 64, and the backfill gap layer 65 by sputtering. Chemical-mechanical polishing or ion milling is performed on the top surface of the large-area upper nonmagnetic metal film 40 to planarize the surface of the large-area upper nonmagnetic metal film 40. This surface smoothness is sufficiently secured even when an inductive head for recording is laminated on the upper shield layer 50. The thickness of the large-area upper nonmagnetic metal film 40 after chemical-mechanical polishing is used for the complete CPP-GMR head 1.

Then, the upper shield layer 50 is formed on the planarized surface of the large-area upper nonmagnetic metal film 40 by sputtering. The upper shield layer 50 may be successively formed by sputtering subsequent to the formation of the large-area upper nonmagnetic metal film 40.

According to the steps described above, the CPP-GMR head 1 shown in FIGS. 1 to 3 is completed.

FIG. 10 is a schematic plan view of the CPP-GMR head 1' according to a second embodiment of the present invention when viewed from above. The CPP-GMR head 1' includes a pair of longitudinal bias layers 63' for applying a longitudinal bias magnetic field to the free magnetic layer 33, the longitudinal bias layers 63' being in contact with both sides of the first portion A and the second portion B along the height direction. The second insulating layer 64', having the same area as that of the longitudinal bias layer 63', is provided on the longitudinal bias layers 63' as in the first embodiment. The bias underlying layer 62' and the first insulating layer 61', each of which have the same area as that of the longitudinal bias layers 63', are provided below the longitudinal bias layer 63' as in the first embodiment. The second embodiment differs from the first embodiment in that the width d2 of each of the longitudinal bias layers 63' in the track-width direction in the second portion B is extremely smaller than the width d1 in the first portion A (d2<<d1). The width d2 in the second portion B is set at a controllable minimum width in the track-width direction. In the first portion A, in order to apply a longitudinal bias magnetic field to the free magnetic layer 33 in an optimum intensity, it is preferable to provide the longitudinal bias layers 63' each having a large width. In the second portion B, in order not to apply a longitudinal bias magnetic field, it is preferable to provide the longitudinal bias layers 63' each having a sufficiently small width. Furthermore, the longitudinal bias layers 63' preferably serve as boundaries for determining the outside shape of the pinned magnetic layer 31. In this way, satisfactorily small widths of the longitudinal bias layers 63' provided at the both sides of the pinned magnetic layer 31 in the second portion B result in a reduction in the intensity of the longitudinal bias magnetic field applied to the second portion B of the pinned magnetic layer 31 because of a demagnetizing field, thereby reducing magnetic fluctuations of the pinned magnetic layer 31 in the second portion B. In order to form the pair of longitudinal bias layers 63' having such shapes, in the process for producing the CPP-GMR head 1 according to the first embodiment, the second resist layer R2 as shown in FIGS. 6A and 6B is formed so that the longitudinal bias layers 63' having the target shapes will be formed.

Figure 11:
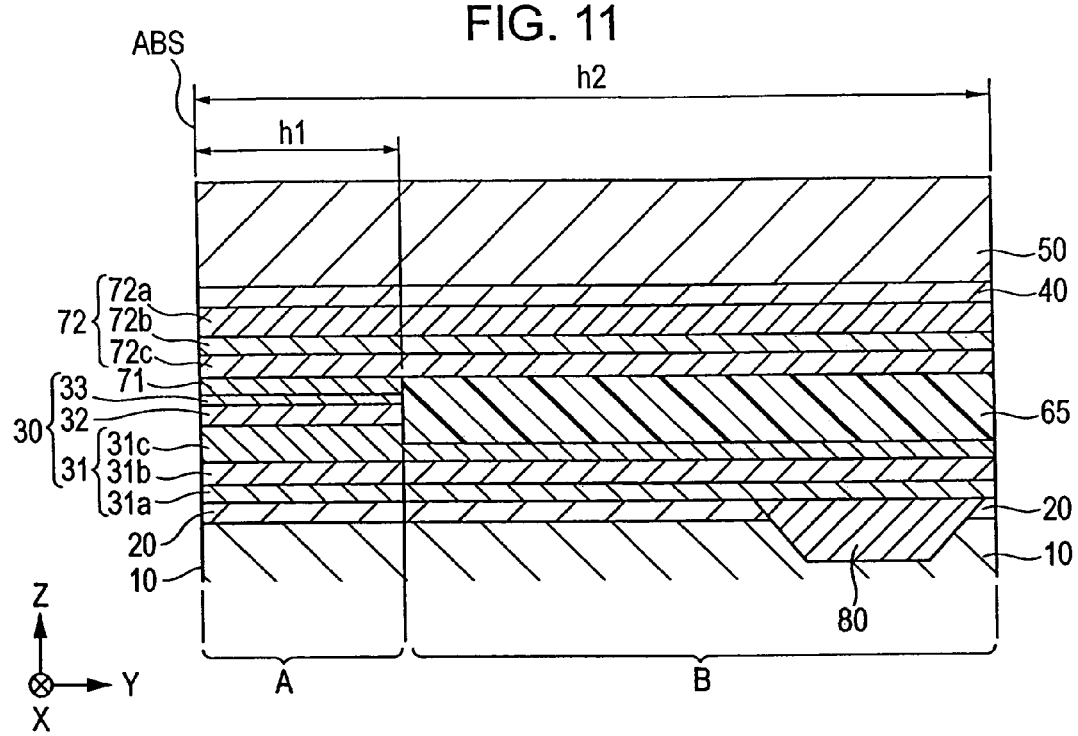
FIG. 11 is a fragmentary sectional view taken along the direction parallel to the height direction through the center of a dual spin-valve CPP-GMR head according to the present invention.
Figure 12:
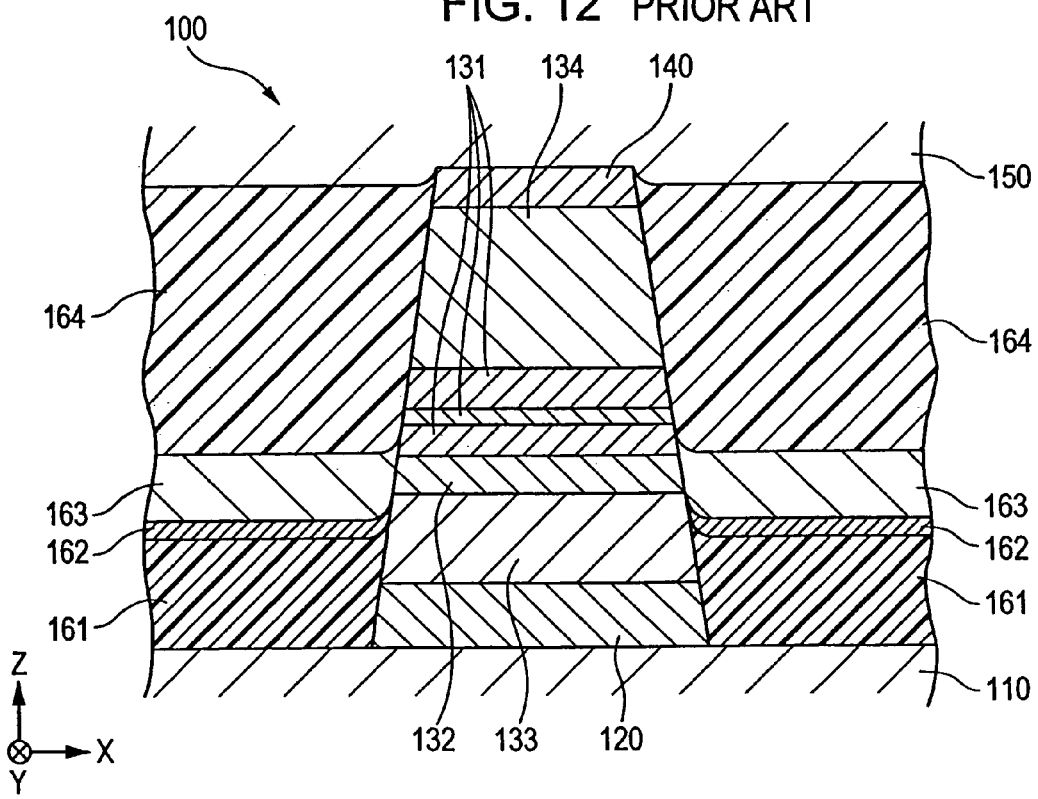
FIG. 12 is a fragmentary sectional view of a conventional CPP-GMR head when viewed from the surface facing a storage medium.

The single spin-valve CPP-GMR head according to the embodiment of the present invention has been described above. The present invention is also available to a dual spin-valve CPP-GMR head. In the dual spin-valve CPP-GMR head, for example, as shown in FIG. 11, includes an upper nonmagnetic material layer 71, and an upper pinned magnetic layer 72 in which the width of the upper pinned magnetic layer 72 in the track-width direction in the portion B behind the element in the height direction is greater than that in the portion A in the same way as the pinned magnetic layer 31. The upper pinned magnetic layer 72 includes a second upper pinned magnetic sublayer 72a, a nonmagnetic intermediate sublayer 72b, and a first upper pinned magnetic sublayer 72c. The large-area upper nonmagnetic metal film 40 and the upper shield layer 50 are formed on the structure that includes the lower shield layer 10 to the free magnetic layer 33 and the backfill gap layer 65 shown in FIG. 1. An antiferromagnetic layer for fixing the magnetization direction of the upper pinned magnetic layer 72 may or may not be provided. When the antiferromagnetic layer is provided, the antiferromagnetic layer is preferably interposed between the upper pinned magnetic layer 72 and the large-area upper nonmagnetic metal film 40 behind the portion A in the height direction. In FIG. 11, the antiferromagnetic layer for fixing the magnetization direction of the upper pinned magnetic layer 72 is not provided.

The above-described CPP-GMR heads according to the embodiments can be applied to not only a playback thin-film magnetic head but also to a recording/playback thin-film magnetic head in which an inductive head for recording is laminated to the playback thin-film magnetic head.

What is claimed is:

1. A CPP giant magnetoresistive head comprising:
a lower shield layer;
an upper shield layer; and
a giant magnetoresistive element between the lower shield layer and the upper shield layer, the giant magnetoresistive element comprising:
a nonmagnetic material layer;
a pinned magnetic layer; and
a free magnetic layer, the pinned magnetic layer and the free magnetic layer being laminated with the nonmagnetic layer provided therebetween, a current flowing perpendicularly to a film plane of the giant magnetoresistive element, the pinned magnetic layer extending in a direction extending perpendicular from a storage medium longer than in a track-width direction and including a first portion and a second portion, the first portion being disposed above or below the nonmagnetic material layer and the free magnetic layer, and a second portion behind the nonmagnetic material layer and the free magnetic layer in the direction extending perpendicular from the storage medium, the first portion and the second portion being in the same plane, a width of the pinned magnetic layer in the track-width direction in the second portion being greater than that in the first portion.

2. The CPP giant magnetoresistive head according to claim 1, wherein the second portion includes a slope section where the width of the pinned magnetic layer in the track-width direction is increased from the first portion toward the second portion.

3. The CPP giant magnetoresistive head according to claim 2, wherein an angle of inclination of the slope section is 5° to 45° with respect to a side face along the height direction in the first portion.

4. The CPP giant magnetoresistive head according to claim 1, further comprising:
a pair of longitudinal bias layers being in contact with both sides of the giant magnetoresistive element along the direction extending perpendicular from the storage medium and applying a longitudinal bias magnetic field to the free magnetic layer, a width of each longitudinal bias layer in the track-width direction in the second portion being smaller than that in the first portion.

5. The CPP giant magnetoresistive head according to claim 4, wherein the pair of longitudinal bias layers each having a controllable minimum width in the track-width direction is provided at the second portion.

6. The CPP giant magnetoresistive head according to claim 1, wherein the pinned magnetic layer comprises a magnetic material having a positive magnetostriction constant, and an end of the pinned magnetic layer is exposed at a surface facing the storage medium.

* * * * *